(12) United States Patent
Adamopoulos et al.

(10) Patent No.: US 9,517,933 B2
(45) Date of Patent: Dec. 13, 2016

(54) PROCESS FOR CATALYTIC REFORMING

(71) Applicant: UOP, LLC, Des Plaines, IL (US)

(72) Inventors: Eleftherios Adamopoulos, Gurnee, IL (US); Wim Frans Elseviers, Oost-Vlaanderen (BE); Bryan K. Glover, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 389 days.

(21) Appl. No.: 14/034,363

(22) Filed: Sep. 23, 2013

(65) Prior Publication Data

US 2015/0086472 A1    Mar. 26, 2015

(51) Int. Cl.
  C01B 3/24   (2006.01)
  C01B 3/50   (2006.01)
  C01B 3/26   (2006.01)

(52) U.S. Cl.
  CPC .......... C01B 3/508 (2013.01); C01B 3/26 (2013.01); C01B 2203/042 (2013.01); C01B 2203/043 (2013.01); C01B 2203/0405 (2013.01); C01B 2203/048 (2013.01); C01B 2203/1247 (2013.01); C01B 2203/146 (2013.01); C01B 2203/147 (2013.01); C01B 2203/148 (2013.01)

(58) Field of Classification Search
  USPC ........................................................ 423/650
  See application file for complete search history.

(56) References Cited

U.S. PATENT DOCUMENTS

| | | | |
|---|---|---|---|
| 3,367,135 A | 2/1968 | Greacen et al. | |
| 4,362,613 A | 12/1982 | MacLean | |
| 4,548,619 A | 10/1985 | Steacy | |
| 4,863,492 A | 9/1989 | Doshi et al. | |
| 5,157,200 A | 10/1992 | Mikkinen et al. | |
| 5,332,492 A | 7/1994 | Maurer et al. | |
| 5,411,721 A | 5/1995 | Doshi et al. | |
| 5,689,032 A | 11/1997 | Krause et al. | |
| 5,861,137 A | 1/1999 | Edlund | |
| 6,011,192 A | 1/2000 | Baker et al. | |
| 6,171,472 B1 | 1/2001 | Lokhandwala et al. | |
| 6,183,628 B1 | 2/2001 | Baker et al. | |

(Continued)

FOREIGN PATENT DOCUMENTS

JP    2006111472 A    4/2006

OTHER PUBLICATIONS

Allen, "Managing Hydrogen Recovery", International Journal of Hydrocarbon Engineering, Apr. 1999, vol. 4, No. 4, pp. 71-75.

(Continued)

*Primary Examiner* — Melvin C Mayes
*Assistant Examiner* — Kenneth Vaden

(57) ABSTRACT

One exemplary embodiment can be a process for catalytic reforming. The process can include catalytically reforming a hydrocarbon feed in a reaction zone, obtaining an effluent stream having hydrogen and hydrocarbons from the reaction zone, obtaining from at least a portion of the effluent stream a waste hydrocarbon stream from an adsorption zone, passing at least a portion of the waste hydrocarbon stream as a feed stream across a feed side of a membrane having the feed side and a permeate side, and being selective for hydrogen over one or more C1-C6 hydrocarbons, and withdrawing from the permeate side a permeate stream enriched in hydrogen compared with a residue stream withdrawn from the feed side.

12 Claims, 1 Drawing Sheet

(56) References Cited

U.S. PATENT DOCUMENTS

| | | | |
|---|---|---|---|
| 6,299,994 | B1 | 10/2001 | Towler et al. |
| 6,350,371 | B1 | 2/2002 | Lokhandwala et al. |
| 6,544,316 | B2 | 4/2003 | Baker et al. |
| 6,592,749 | B1 | 7/2003 | Lokhandwala et al. |
| 7,637,984 | B2 | 12/2009 | Adamopoulos |
| 8,071,063 | B2 | 12/2011 | Reyes et al. |
| 8,394,171 | B2 | 3/2013 | Elseviers et al. |
| 2002/0104435 | A1 | 8/2002 | Baker et al. |
| 2004/0050250 | A1* | 3/2004 | Pinnau et al. .................... 95/45 |
| 2005/0229491 | A1 | 10/2005 | Loffler |
| 2006/0013762 | A1 | 1/2006 | Kuipers et al. |
| 2011/0147270 | A1 | 6/2011 | Goldstein et al. |
| 2011/0177410 | A1 | 7/2011 | Assink et al. |

OTHER PUBLICATIONS

Du Pont De Nemours E I & Co; Monsanto Co, "Du Pont membrane system recovers hydrogen", Chem. Eng. News, Apr. 14, 1986, vol. 64, No. 15, p. 24.
Miller et al., "Selection of a Hydrogen Separation Process", Natl. Pet. Refiners Assoc. Annu. Meet. Pap. N. AM-89-55, Mar. 19, 1989, p. 36 Pages.
Osumi, "Trends in Demand for Hydrogen Gas and Gas Separation Technology", Chemical Economy & Engineering Review, Oct. 1983, vol. 15, No. 10, pp. 7-14.
Tomlinson et al., "H2 recovery processes compared", Oil & Gas Journal, Jan. 15, 1990, vol. 88, No. 3, pp. 35-39.
Wilcher et al., "Technologies for the Separation and Recovery of Hydrogen from Refinery Streams", ACS 210th National Meeting ACS Division of Petroleum Chemistry, Inc., Aug. 1995, vol. 40, No. 4, pp. 720-723.
Search Report dated Dec. 11, 2014 for corresponding PCT Appl. No. PCT/US2014/053979.

* cited by examiner

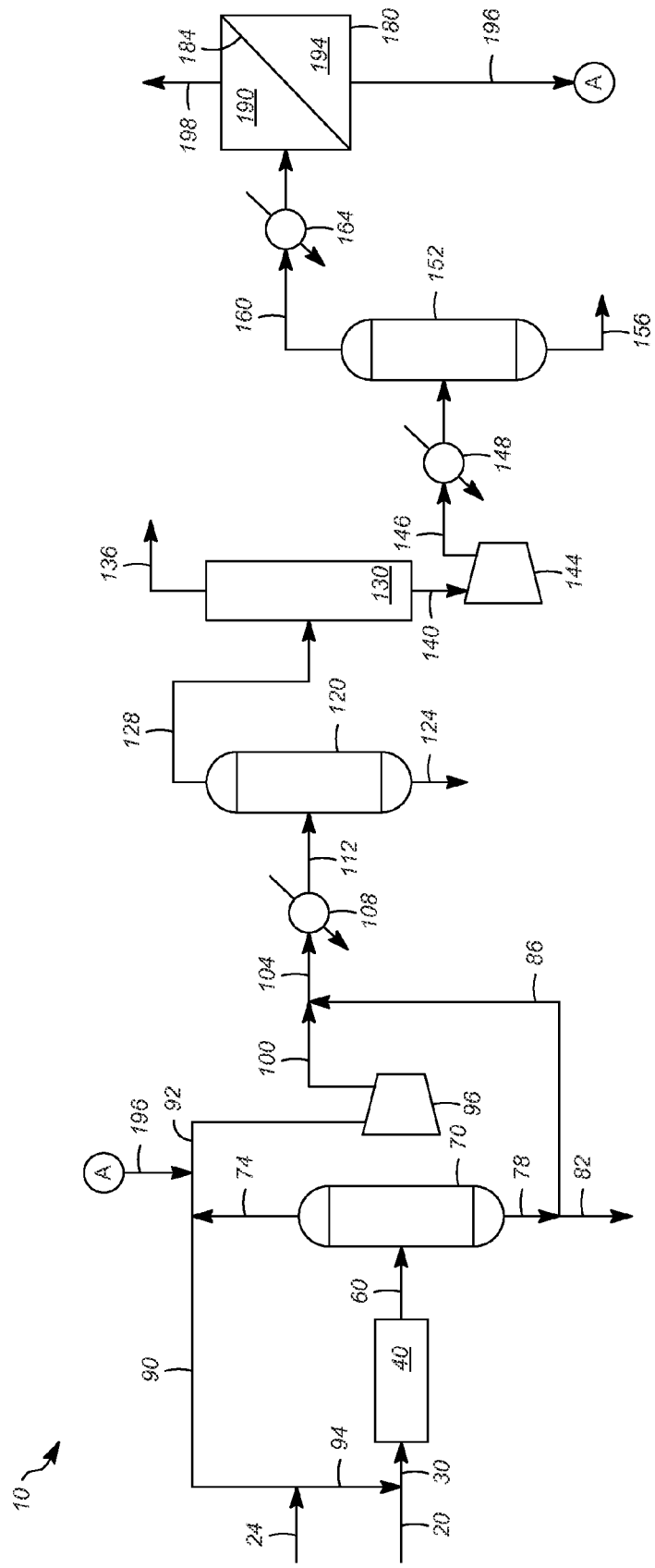

PROCESS FOR CATALYTIC REFORMING

FIELD OF THE INVENTION

This invention generally relates to a process for catalytic reforming.

DESCRIPTION OF THE RELATED ART

Various types of catalytic hydrocarbon conversion reaction systems utilized in petroleum and petrochemical industries can convert hydrocarbons to different products. The reactions employed in such systems can be either exothermic or endothermic. Usually, the reactions result in either the net production of hydrogen or the net consumption of hydrogen.

A hydrogen recovery system can be used for reforming processes producing hydrogen. Generally, a net production of hydrogen occurs during catalytic reforming, and recovery of the hydrogen for use in chemical processing or fuel is typically desired.

However, current hydrogen recovery systems suffer from several shortcomings. Many fail to remove sufficient amounts of heavier compounds, such as nitrogen, carbon oxides, including carbon monoxide, methane, ethane, and ethene, resulting in greater energy consumption by a compressor. Also, insufficient systems for separating hydrogen gas from contaminants can allow catalytic poisoning if the hydrogen gas is recycled to a reforming zone or used in other hydroprocessing catalytic processes. Additionally, if the recovered hydrogen has a sufficiently different composition and is combined with another hydrogen gas, such a combination may result in process upsets, such as impeding compressor efficiency. As such, there is a desire to provide other separation and/or hydrogen recovery systems to overcome these deficiencies.

SUMMARY OF THE INVENTION

One exemplary embodiment can be a process for catalytic reforming The process can include catalytically reforming a hydrocarbon feed in a reaction zone, obtaining an effluent stream having hydrogen and hydrocarbons from the reaction zone, obtaining from at least a portion of the effluent stream a waste hydrocarbon stream from an adsorption zone, passing at least a portion of the waste hydrocarbon stream as a feed stream across a feed side of a membrane having the feed side and a permeate side, and being selective for hydrogen over one or more C1-C6 hydrocarbons, and withdrawing from the permeate side a permeate stream enriched in hydrogen compared with a residue stream withdrawn from the feed side.

Another exemplary embodiment may be a process for catalytic reforming The process may include catalytically reforming a hydrocarbon feed in a reaction zone, obtaining an effluent stream having hydrogen and hydrocarbons from the reaction zone, obtaining from at least a portion of the effluent stream a waste hydrocarbon stream from an adsorption zone, passing at least a portion of the waste hydrocarbon stream as a feed stream across a feed side of a hollow fiber membrane having the feed side and a permeate side, and being selective for hydrogen over nitrogen, carbon monoxide, and one or more C1-C6 hydrocarbons, and withdrawing from the permeate side a permeate stream enriched in hydrogen and having at least about 85%, by mole, hydrogen.

A further exemplary embodiment can be a process for catalytic reforming The process may include catalytically reforming a hydrocarbon feed in a reaction zone; obtaining an effluent stream having hydrogen and hydrocarbons from the reaction zone; separating a reformate liquid stream and a gas stream, having hydrogen and at least one of nitrogen, one or more carbon oxides, and one or more C1-C6 hydrocarbons, from the effluent stream; recycling at least a portion of the gas stream to the reaction zone; passing at least another portion of the gas stream to an adsorption zone to separate hydrogen; withdrawing a hydrogen product stream from the adsorption zone; withdrawing a tail gas stream from the adsorption zone; compressing and cooling the tail gas stream; passing at least a portion of a waste hydrocarbon stream as a feed stream across a feed side of a hollow fiber membrane having the feed side and a permeate side, and being selective for hydrogen over at least one of nitrogen, the one or more carbon oxides, and the one or more C1-C6 hydrocarbons; withdrawing from the permeate side a permeate stream enriched in hydrogen compared to a residue stream; and withdrawing from the feed side the residue stream enriched in at least one of nitrogen, the one or more carbon oxides, and the one or more C1-C6 hydrocarbons compared to the permeate stream.

The embodiments herein can reduce compressor energy consumption because molecules heavier than hydrogen are removed from a recycled gas provided to a suction of a compressor. Also, removing these heavier compounds and providing purer hydrogen may prevent contamination and poisoning of reforming catalyst and other downstream hydroprocessing catalyst. Furthermore, the recycled gas passed through the membrane can have a composition proximate to a gas stream upstream of the pressure swing adsorber, thereby minimizing upsets.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, carbon oxides, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. A "stream" may also be or include substances, e.g., fluids or substances behaving as fluids, other than hydrocarbons, such as air, hydrogen, or catalyst.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the terms "adsorbent" and "adsorber" include, respectively, an absorbent and an absorber, and relates, but is not limited to, adsorption, and/or absorption.

As used herein, the term "liquid hourly space velocity" can be defined as volumes of fresh charge stock per hour per volume of catalyst particles in the reaction zone and be abbreviated "LHSV".

As used herein, the term "hour" may be abbreviated "hr", the term "kilogram" may be abbreviated "kg", the term "kilopascal" may be abbreviated "KPa", and the terms "degrees Celsius" may be abbreviated "°C". All pressures are absolute.

As depicted, process flow lines in the figures can be referred to interchangeably as, e.g., lines, pipes, feeds, effluents, products, portions, remainders, discharges, or streams.

BRIEF DESCRIPTION OF THE DRAWING

The FIGURE is a schematic depiction of an exemplary catalytic reforming zone.

DETAILED DESCRIPTION

Referring to the FIGURE, a catalytic reforming zone 10 can include a reaction zone 40, a separation zone or a first separation zone 70, a vessel or a first vessel 120, an adsorption zone 130, another vessel or a second vessel 152, and another separation zone or a second separation zone 180. Generally, the catalytic reforming zone 10 uses single or multiple reaction zones with catalyst particles disposed as fixed beds or movable via gravity flow. Exemplary reforming reaction zones are disclosed in, e.g., US 2011/0147270 and U.S. Pat. No. 6,350,371. The reforming process can be particularly applicable to the treatment of straight-run gasolines including relatively large concentrations of naphthenic and substantially straight-chain paraffinic hydrocarbons that may be amenable to aromatization through dehydrogenation and/or cyclization. To summarize, various other concomitant reactions also occur, such as isomerization and hydrogen transfer, which are beneficial in upgrading the anti-knock properties of the selected gasoline fraction. Typically, catalytic reforming treats a naphtha boiling range fraction to improve its anti-knock characteristics. In this exemplary embodiment, only a single reaction zone 40 is depicted, although several zones can be used in series or in parallel. Often, these catalytic reforming zones result in the net production of hydrogen.

A hydrocarbon feed 20 can be provided to the catalytic reforming zone 10. The hydrocarbon feed 20 can include any suitable hydrocarbon fraction, such as naphtha boiling range fractions. The hydrocarbon fraction may be a full boiling range gasoline fraction having an initial boiling point of from about 10-about 40° C., and an end boiling point from about 160-about 220° C. Alternatively, the hydrocarbon fraction has an initial boiling point of about 60-about 130° C., and an end boiling point of about 170-about 220° C. Often, this higher boiling fraction is commonly referred to as naphtha.

Typically, the catalytic reforming reaction is conducted in a reaction zone 40 including either a fixed or a moving catalyst bed. Usually, the reaction zone 40 has a plurality of catalyst beds, commonly referred to as stages, and the catalyst beds may be stacked and enclosed within a single reactor vessel, or the catalyst beds may each be enclosed in a separate reactor vessel in a side-by-side reactor arrangement. Generally, a reaction zone includes two to four catalyst beds in either the stacked and/or side-by-side configuration. The amount of catalyst used in each of the catalyst beds may be varied to compensate for the endothermic heat of reaction in each case. For example, in a three-catalyst bed system, the first bed can contain from about 10-about 30%, by volume; the second, from about 25-about 45%, by volume; and the third, from about 40-about 60%, by volume, all percentages being based on the amount of catalyst within the reaction zone. The reactant or combined feed 30, including a combined hydrogen stream 94 and the hydrocarbon feed 20, should desirably flow serially through the reaction beds in order of increasing catalyst volume and interstage heating. The unequal catalyst distribution, increasing in the serial direction of reactant stream flow, can facilitate and enhance the distribution of the reactions.

Usually, the reforming process uses catalyst including platinum on an alumina support. Generally, these catalysts include about 0.05-about 5%, by weight, platinum. Certain promoters or modifiers, such as cobalt, nickel, rhenium, germanium and tin, can be incorporated into the reforming catalyst to enhance its performance.

The catalytic reforming may be a vapor phase operation effected at a catalyst bed temperature of about 370-about 550° C. Other conditions may include a pressure of about 130-about 6,900 KPa, a liquid hourly space velocity of about 0.2-about 10 $hr^{-1}$, and a hydrogen to hydrocarbon mole ratio of about 0.5:1-about 10:1.

Upon removal of the effluent stream 60 including one or more hydrocarbons and hydrogen from the reaction zone 40, the effluent stream 60 is typically subjected to indirect heat exchange with the combined hydrogen stream 94 and the combined feed 30 to the reaction zone 40. Such an indirect heat exchange can cool the reaction zone effluent stream 60. Afterwards, the reaction zone effluent stream 60 may be passed to the separation zone 70, having a vapor-liquid equilibrium vessel, such as a flash or knockout drum, to recover a hydrogen-rich gas stream 74 from the effluent stream 60. At least a portion of the gas stream 74 may be recycled as a recycle stream 90. Optionally, a make-up hydrogen stream 24 can be added to the recycle stream 90 to form the combined hydrogen stream 94, although the recycle stream 90 may itself provide sufficient hydrogen to the reaction zone 40. The remainder 92 of the gas stream 74 can be combined with a permeate or another recycle stream 196, as hereinafter described, and provided to a compressor 96 to obtain a discharge stream 100.

Often, the separation zone 70 is maintained at substantially the same pressure as the reaction zone 40, allowing for the pressure drop in the system. Typically, the separation zone 70 includes a flash drum for containing the vapor-liquid equilibrium. Usually, the temperature within the separation zone 70 is maintained at about 10-about 70° C. Generally, the temperature and pressure are selected in order to produce a hydrogen-rich gas stream and a principally liquid stream including unstabilized reformate.

Usually, a principally liquid phase including an unstabilized liquid reformate stream 78 is withdrawn from the separation zone 70. The unstabilized liquid reformate stream 78 can be split into a product stream 82 and at least a portion 86. The product stream 82 can be withdrawn from the catalytic reforming zone 10. The at least a portion 86 of this unstabilized liquid reformate stream 78 having about 50-about 100%, by volume, of the unstabilized liquid reformate stream 78 is withdrawn, optionally pressurized, and combined with the discharge stream 100 to form a combined stream 104.

Often, this combined stream 104 is precooled in a condenser 108, which typically uses cooling water as the cooling medium. Usually, this precooling provides a cooled stream 112 to produce favorable equilibrium conditions in the vessel 120 for reducing the content of liquefiable hydrocarbons in any obtained gas stream. In one exemplary embodiment, the vessel 120 can be a knockout drum, a flash drum allowing mixing and flashing, or a counter-current absorber including a packed or trayed column. Recontacting can occur so the composition temperature and pressure of the gas and vapor liquid entering the vessel 120 may be different from that in the separation zone 70 so that a new vapor equilibrium is established. Generally, the conditions within the vessel 120 include a temperature of about −20-about 60° C., preferably of about −10-about 20° C., and a pressure of about 340-about 3,600 KPa. Alternatively, the recontacting can be conducted in a plurality of stages. If a plurality of stages is used, each stage can be conducted at the same or different conditions, e.g., temperature and/or pressure, with respect to the other stage or stages. Often, the vessel 120 is operated at relatively warm conditions to maximize the absorption of the liquefiable hydrocarbons by the liquid reformate stream. The pressure and temperature conditions within the vessel 120 may be set to recover a recontacted hydrogen stream or at least a portion of a compressed, cooled waste hydrocarbon stream 128 and another liquid stream 124, which can exit the catalytic reforming zone 10. The purity of the waste hydrocarbon stream 128 can be about 85-about 95%, by mole, hydrogen.

The compressed, cool waste hydrocarbon stream 128 may be passed to the adsorption zone 130, which can be a pressure swing adsorption (which may be abbreviated "PSA") zone 130, to produce a hydrogen product stream 136 with a purity of about 90.0-about 99.9999%, by mole, hydrogen, or preferably of about 95.0-about 99.99%, by volume, hydrogen. The hydrogen product stream 136 may recover about 80-about 95%, by mole, or even about 85-about 90%, by mole, of the hydrogen in the cool waste hydrocarbon stream 128. Additionally, a tail gas stream 140 may be produced by the PSA zone 130 during a desorption or purge step at a desorption pressure ranging from about 30-about 550 KPa.

The PSA zone 130 can include a plurality of adsorption beds containing an adsorbent selective for the separation of hydrogen from the hydrocarbons. Often, each adsorption bed within the adsorption zone undergoes, on a cyclic basis, high pressure adsorption, optional cocurrent depressurization to intermediate pressure levels with the release of product from void spaces, countercurrent depressurization to lower desorption pressure with the release of desorbed gas from the feed end of the adsorption bed, with or without purge of the bed, and repressurization to higher adsorption pressure. This process may also include an addition to this basic cycle sequence, such as a cocurrent displacement step, or co-purge step in the adsorption zone following the adsorption step in which the less readily adsorbable component, or hydrogen, is essentially completely removed therefrom by displacement with an external displacement gas introduced at the feed end of the adsorption bed. The adsorption zone may then be countercurrently depressurized to a desorption pressure that is at or above atmospheric pressure with the more adsorbable component being discharged from the feed end thereof.

In a multibed adsorption system, the displacement gas used for each bed may be obtained by using at least a portion of the debutanizer overhead vapor stream, although other suitable displacement gas, such as an external stream including one or more C1-C4 hydrocarbons, may also be employed. Usually, the high pressure adsorption includes introducing the feedstream or hydrogen-rich gas stream to the feed end of the adsorption bed at a high adsorption pressure. The hydrogen passes through the bed and is discharged from the product end thereof. An adsorption front or fronts are established in the bed with the fronts likewise moving through the bed from the feed end toward the product end thereof Preferably, the PSA zone 130 can include pressures of about 300-about 3,600 KPa.

The PSA zone 130 can be carried out using any adsorbent material selective for the separation of hydrogen from hydrocarbons in the adsorbent beds. Suitable adsorbents can include one or more crystalline molecular sieves, activated carbons, activated clays, silica gels, activated aluminas, and combinations thereof. Preferably, the adsorbents are one or more of an activated carbon, an alumina, an activated alumina, and a silica gel. An exemplary PSA zone is disclosed in, e.g., U.S. Pat. No. 5,332,492.

The PSA zone 130 can provide the hydrogen product stream 136 that can be provided to the reaction zone 40 or other suitable processes, and the tail gas stream 140. The tail gas stream 140 can be provided to another compressor 144, which can be a tail gas compressor. The another compressor 144 may provide a compressor discharge 146, which in some exemplary embodiments may be at fuel header pressure, to another condenser 148 receiving a cooling water stream. The cooled compressor discharge 146 may be passed to another vessel 152, which can provide a liquid stream 156 and a vapor stream 160. The liquid stream 156 may exit the catalytic reforming zone 10 and the vapor stream 160 can be optionally provided to still another condenser 164. The cooled vapor stream 160 may be sent to the another separation zone 180.

The another separation zone 180 may include a membrane 184 forming a feed side 190 and a permeate side 194. Often, the membrane 184 includes a hollow fiber membrane or a spiral wound membrane. The hollow fiber membrane can be made of at least one of a polyimide, cellulose acetate, cellulose triacetate, and polysulfone. Typically, the polyimide may be formed by reacting a dianhydride and a diamine or a dianhydride and a diisocyanate. Such membranes are disclosed in, e.g., U.S. Pat. No. 4,863,492.

A residue stream 198 can be withdrawn from the feed side 190 of the membrane 184. The residue stream 198 may include nitrogen; one or more carbon oxides, typically carbon monoxide although carbon dioxide may be present instead or additionally; and the one or more C1-C6 hydrocarbons. Often, the residue stream 198 is enriched in nitrogen, the one or more carbon oxides, typically carbon monoxide, and the one more C1-C6 hydrocarbons compared with the waste hydrocarbon stream 128. The residue stream 198 can be provided to a flare, provided as a feed to another process such as a steam-methane reforming unit, or optionally recontacted in a vessel with a part of the portion 86 to recover liquefied petroleum gases prior to being sent to the flare.

The permeate or another recycle stream 196 can be withdrawn from the permeate side 194 of the membrane 184 at a pressure comparable to the vessel 120 and may be recycled upstream of the compressor 96. Generally, the vapor stream 160 contacts the membrane 184 with the smaller hydrogen molecules passing through the membrane 184 and other molecules, such as C1-C6 hydrocarbons, nitrogen, carbon dioxide, and carbon monoxide, are blocked. Particularly, the membrane 184 can block nitrogen and carbon oxides, such as carbon monoxide.

The membrane 184 can be operated in such a way that the permeate stream 196 can include no more than about 150, about 100, or about 20 ppm, by mole, of nitrogen and no more than about 250, about 100, or about 20 ppm, by mole, of carbon monoxide. Generally, the amount of hydrogen by mole percent in the permeate stream 196 is substantially the same as the gas stream 74 obtained from the effluent stream 60 and upstream of the waste hydrocarbon stream 128, and typically the amount of hydrogen composed in the permeate stream 196 is within about ±15%, about ±5%, about ±2%, or about ±1%, by mole, of the gas stream 74. Additionally, the permeate stream 196 can include at least about 85%, or even at least about 95% or about 96%, by mole, hydrogen. The permeate stream 196 may recover at least about 82%, by mole, of the hydrogen in the vapor stream 160. Meanwhile, the membrane 184 rejects at least about 88%, by mole, carbon monoxide; about 91%, by mole, nitrogen; about 92%, by mole, methane; about 97%, by mole, ethane; and almost 100%, by mole, of the one or more $C3^+$ hydrocarbons in the vapor stream 160. Often, the permeate stream 196 can have no more than about 3%, preferably no more than about 2%, by mole, methane; no more than about 1%, preferably no more than about 0.8%, by mole, C2 hydrocarbon; and no more than about 0.5%, preferably no more than about 0.2%, by mole, one or more $C3^+$ hydrocarbons.

The catalytic reforming zone 10 having the separation zone 180 can achieve an overall hydrogen recovery of at least about 96%, by mole, of the hydrogen present in the stream 74. Generally, the permeate stream 196 can have a purity that is practically equal to that of the gas stream 74. Hence, the embodiments disclosed herein can reduce the total compressor energy consumption of the compressor 96 and the another compressor 144 because molecules heavier then hydrogen are removed from a recycled gas in the remainder 92 provided to the suction of the compressor 96, thereby reducing the flow rate to the compressors 96 and 144. Consequently, the PSA zone 130 can achieve a better recovery because its feed gas, the waste hydrocarbon stream 128, typically has increased hydrogen purity. Furthermore, because the amount of non-hydrogen impurities in the waste hydrocarbon stream 128 is reduced, correspondingly the size of the PSA zone 130 may be reduced. Moreover, impurities removed by the PSA zone 130 can be sent to the tail gas stream 140, which typically has a lower flow rate, thereby reducing the power consumption of the another compressor 144. Also, removing these heavier compounds and providing purer hydrogen in the hydrogen product stream 136 exiting the PSA zone 130 may prevent contamination and poisoning of reforming catalyst and other downstream hydroprocessing catalysts. Furthermore, the recycled gas, namely the permeate stream 196, passed through the membrane 184 can have a composition proximate to that of the gas stream 74 upstream of the PSA zone 130, thereby minimizing upsets.

In an alternative embodiment, one or more chloride treaters may be used for treating the waste hydrocarbon stream 128. However, such treaters may not be required in other versions. Moreover, all or part of the residue stream 198 exiting the membrane 184 may be used as a co-purge stream in the PSA zone 130 to further increase overall hydrogen recovery.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for catalytic reforming, comprising:
    A) catalytically reforming a hydrocarbon feed in a reaction zone;
    B) obtaining an effluent stream comprising hydrogen and hydrocarbons from the reaction zone;
    C) separating a reformate liquid stream and a gas stream, comprising hydrogen and at least one of nitrogen, one or more carbon oxides, and one or more C1-C6hydrocarbons, from the effluent stream;
    D) recycling at least a portion of the gas stream to the reaction zone;
    E) passing at least another portion of the gas stream to said downstream adsorption zone to separate hydrogen;
    F) withdrawing a hydrogen product stream from the adsorption zone;
    G) withdrawing a tail gas stream from the adsorption zone;
    H) compressing and cooling the tail gas stream;
    I) passing at least a portion of the compressed and cooled tail gas stream as a feed stream across a feed side of said downstream membrane zone comprising a polyimide, cellulose acetate, cellulose triacetate, or polysulfone membrane having the feed side and a permeate side, and being selective for hydrogen over at least one of nitrogen, the one or more carbon oxides, and the one or more C1-C6 hydrocarbons;
    J) withdrawing from the permeate side a permeate stream enriched in hydrogen compared to a residue stream, sending at least a part of said permeate stream as the hydrogen rich gas recycle stream to the at least another portion of the gas stream; and
    K) withdrawing from the feed side the residue stream enriched in at least one of nitrogen, the one or more carbon oxides, and the one or more C1-C6 hydrocarbons compared to the permeate stream.

2. The process according to claim 1, wherein the permeate stream comprises no more than about 150 ppm, by mole, of nitrogen and no more than about 250 ppm, by mole, of carbon monoxide.

3. The process according to claim 1, wherein the permeate stream comprises no more than about 100 ppm, by mole, of nitrogen and no more than about 100 ppm, by mole, of carbon monoxide.

4. The process according to claim 1, wherein the permeate stream comprises no more than about 20 ppm, by mole, of nitrogen and no more than about 40 ppm, by mole, of carbon monoxide.

5. The process according to claim 1, wherein an amount of hydrogen by mole percent in the permeate stream is substantially the same as a gas stream obtained from the effluent stream and upstream of the waste hydrocarbon stream.

6. The process according to claim 5, wherein the amount of hydrogen composition in the permeate stream is within about 15%, by mole, of the gas stream.

7. The process according to claim 5, wherein the amount of hydrogen composition in the permeate stream is within about 2%, by mole, of the gas stream.

8. The process according to claim 5, wherein the amount of hydrogen composition in the permeate stream is within about 1%, by mole, of the gas stream.

9. The process according to claim 1, wherein the membrane comprises a hollow fiber membrane.

10. The process according to claim 1, wherein the membrane comprises a spiral wound membrane.

11. The process according to claim 1, wherein the permeate comprises at least about 85%, by mole, hydrogen.

12. The process according to claim 1, wherein the permeate comprises at least about 96%, by mole, hydrogen.

* * * * *